(12) United States Patent
Tame

(10) Patent No.: US 7,633,651 B2
(45) Date of Patent: Dec. 15, 2009

(54) GENERATING A NON-REPRODUCIBLE PRINTED IMAGE

(75) Inventor: Gavin Randall Tame, Pretoria (ZA)

(73) Assignee: Dexrad (Proprietary) Limited (ZA)

( * ) Notice: Subject to any disclaimer, the term of this patent is extended or adjusted under 35 U.S.C. 154(b) by 341 days.

(21) Appl. No.: 10/221,406

(22) PCT Filed: Mar. 14, 2001

(86) PCT No.: PCT/IB01/00362

§ 371 (c)(1),
(2), (4) Date: Jan. 8, 2003

(87) PCT Pub. No.: WO01/69915

PCT Pub. Date: Sep. 20, 2001

(65) Prior Publication Data

US 2003/0149873 A1     Aug. 7, 2003

(30) Foreign Application Priority Data

Mar. 14, 2000  (ZA) ................................ 2000/1296

(51) Int. Cl.
  *H04N 1/40* (2006.01)
(52) U.S. Cl. ...................... 358/3.28; 358/2.1
(58) Field of Classification Search .............. 358/3.01, 358/3.28, 1.9, 2.1, 3.26, 2.18; 283/109–114
  See application file for complete search history.

(56) References Cited

U.S. PATENT DOCUMENTS

| 4,736,363 | A | | 4/1988 | Aubin et al. |
| 5,259,907 | A | * | 11/1993 | Soules et al. ............... 156/277 |
| 5,659,411 | A | * | 8/1997 | Nito et al. ................... 349/117 |
| 6,441,921 | B1 | * | 8/2002 | Soscia ......................... 358/1.9 |
| 6,606,393 | B1 | * | 8/2003 | Xie et al. ..................... 382/100 |

(Continued)

FOREIGN PATENT DOCUMENTS

EP          0 465 090 A1    1/1992

(Continued)

OTHER PUBLICATIONS

Lee, Young, "Strategic Parameter-Driven Routing Models for Multi-Destination Traffic in Telecommunication Networks," 1997 IEEE International Conference on Systems, Man, and Cybernetics (1997).

(Continued)

*Primary Examiner*—Thomas D Lee
*Assistant Examiner*—Stephen M Brinich
(74) *Attorney, Agent, or Firm*—DLA Piper LLP US; Jennifer E. Lacroix, Esq.

(57) ABSTRACT

A method of generating a non-reproducible printed image, for example on a check, involves printing a first, background layer of ink on the document, and then printing data on top of the background layer. The ink used to print the background layer is reflective of light of a predetermined wavelength, typically in the infra red spectrum. The ink used to print the data is visually indistinguishable from the first ink, but absorbs light in the infra red spectrum, so that when the printed image is illuminated with infra red light, the image can be discerned. The image typically comprises an encrypted symbolic image and is used for security purposes.

18 Claims, 2 Drawing Sheets

U.S. PATENT DOCUMENTS 6,643,382 B1 * 11/2003 Maeda ........................ 382/100

FOREIGN PATENT DOCUMENTS

| EP | 0 605 208 | 7/1994 |
|---|---|---|
| EP | 0 727 753 | 8/1996 |
| WO | WO 95/13597 | 5/1995 |
| WO | WO 96/18972 | 6/1996 |

OTHER PUBLICATIONS

Lin, Frank Y.S., et al., "A Minimax Utilization Routing Algorithm in Networks with Single-path Routing," GLOBECOM '93 IEEE Global Telecommunications Conference & Exhibition (1993).

* cited by examiner

```
"!!!!!!!!!!!!!!!!!!!!!!!!!!!!!"
"//////////////////////////////"
"!181888!1919988!1A1A988!1B1B988!"
"38396162636465666768696A6B6C6D6E"
"6F707172737475767778797A41424344"
"45464748494A4B4C4D4E4F5051525354"
"55565758595A30313233343536373839"
"6162636465666768696A6B6C6D6E6F70"
"!38B908!39BA188!3ABB188!3BBC188!"
"797A4142434445464748494A4B4C4D4E"
"4F5051525354555657585 95A30313233"
"3435363738396162636465666555555"
"!2AAA88!2AAA988!2AAA988!2AAA988!"
"!!!!!!!!!!!!!!!!!!!!!!!!!!!!!!"
"//////////////////////////////"
"END"
```

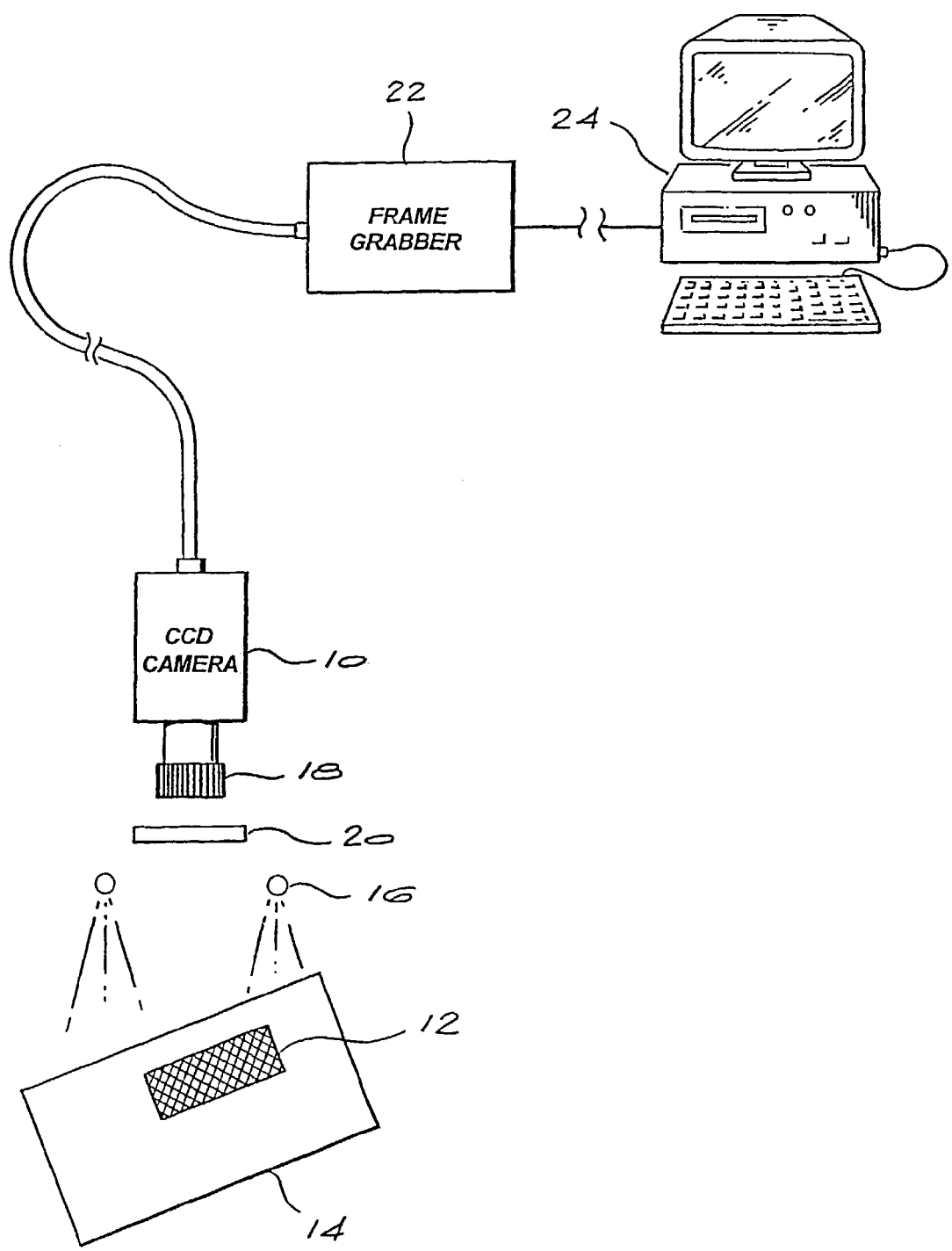

GENERATING A NON-REPRODUCIBLE PRINTED IMAGE

BACKGROUND OF THE INVENTION

This invention relates to a method of generating a non-reproducible printed image which can be utilised in the production of documents which are not to be copied.

Valuable documents such as cheques, vouchers, identification documents and the like are subject to fraudulent copying, and various schemes have been adopted in order to make such copying difficult. However, as the technology available to counterfeiters becomes more sophisticated, it is necessary to adopt more and more sophisticated measures to prevent unauthorised copying of such documents.

SUMMARY OF THE INVENTION

According to a the invention there is provided a method of generating a non-reproducible printed image, comprising the steps of:
applying a first, background layer of an ink which reflects light of a predetermined wavelength or range of wavelengths to a substrate; and
printing the image on the background layer using an ink which absorbs light of the wavelength or range of wavelengths.

The wavelength or range of wavelengths may be in the infrared spectrum.

The substrate may comprise sheet material such as paper, card or another generally planar material.

For example, the substrate may be a sheet of paper, a card or tag, a label, a ticket, an identification plate, or any other article to which the ink can be applied.

The image may be a bar-code or symbolic image, preferably a two-dimensional encrypted bar-code or symbolic image.

The invention extends to apparatus for reading the non-reproducible printed image printed by the above defined method, the apparatus comprising:
a camera;
a filter for filtering an image captured by the camera at a predetermined wavelength or range of wavelengths; and
an illuminator arranged to illuminate the non-reproducible printed image with light at said wavelengths or range of wavelengths, so that infra red light reflected by the first, background layer of the printed image is passed by the filter, permitting reproduction of the image by the camera.

Preferably, the filter comprises an infra red filter and the illuminator comprises an infra red light source.

BRIEF DESCRIPTION OF THE DRAWINGS

FIG. 3 shows apparatus of reading the image.

DESCRIPTION OF AN EMBODIMENT

Figures 1, 2:
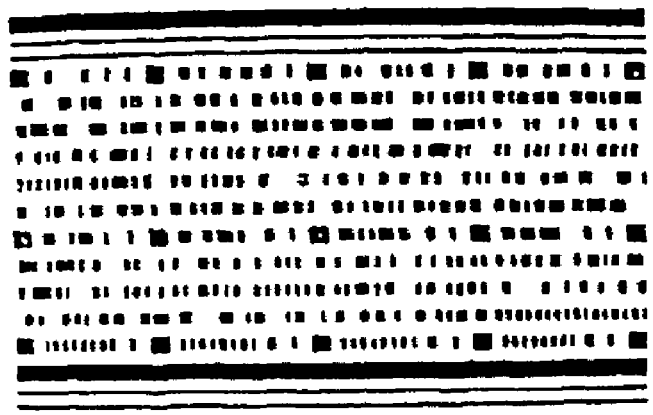
FIG. 1 shows data corresponding to an image generated according to the invention, in a text string format.
FIG. 2 shows the image as printed.

The present invention will be described with reference to a practical application in the safeguarding of paper documents which have monetary value, such as cheques or vouchers. It will be appreciated that the described embodiment is purely exemplary, and that the invention has application in other areas as well. In particular, the invention is not limited to use with paper documents, but can be used in conjunction with other substrates such as, for example, credit cards or identification cards, drivers licenses, certificates, share certificates, banknotes, labels, identification plates or tags.

In the prototype application, a system was required to prevent cheques and vouchers from being created illicitly, and to prevent printed cheques and vouchers from being duplicated. It was also required to store information on the drawer of the cheque, to incorporate unique serial numbers for each cheque for use in making enquiries on the drawer's cheque/voucher printing database, and to carry accountability data on the cheque. It was also required to incorporate verification details of an authorised bearer or holder of the cheque in the non-reproducible image printed on the cheque.

To achieve this, a "data watermark" was designed which can be printed on the paper of the cheque or voucher but which cannot be copied. Within the watermark image is machine readable symbolic data, comprising symbols which can be acquired by a computer and decoded or interpreted into data which can be processed by the computer in a conventional manner. These symbols are a printed symbolic representation of computer data which is encrypted prior to the creation of the symbols. The symbols are extracted in use from the non-reproducible image or watermark by means of a specific imager designed for this purpose.

The first step in the creation of cheques or vouchers according to the method of the invention is the preprocessing of a batch of blank cheques or vouchers with a first, background layer of ink. A block is printed in a predetermined area of the cheque or voucher using an ink which is highly reflective in the infra red spectrum in the 800 nm to 975 nm range. This spectrum corresponds to the spectrum of the infra red radiation emitted by an LED scanning device used to read the cheques. The ink appears black when illuminated by visible light, but has little or, preferably, no carbon content. If the background ink contains even a small amount of carbon, this will reduce the reflectivity of the ink to the infra red spectrum, resulting in a lack of contrast between the background ink and the second layer of ink printed on top, which is infra red-absorbing. Ideally, the background ink has no carbon content, while the foreground ink has a high carbon content.

Most black inks use a high proportion of carbon in order to render them dark. However, it is possible to make use of a mix of pure dark colours which have no carbon in them in order to obtain a "clear black". For example, a colour mix comprising equal proportions of dark non-carbon based pure colours such as red, green and blue or cyan, magenta and yellow can give a dark shade of grey which is suitable for the above purpose. Certain existing computer printers and plastic card printers are available that make use of inks which are non-carbon based and which are highly reflective in the infra red part of the spectrum. Certain colour ink jet printers, such as the Epson stylus (trade mark) printers make use of non-carbon based inks.

Before a cheque or voucher is printed, it is necessary to capture the relevant data which is to be represented thereon. This includes details of the drawer of the cheque/voucher, the payee, the date and the amount. This data is sent to a compression software program as an input file, and is read and compressed so that more data can be represented by two dimensional symbols or barcodes which occupy a relatively small physical area. The compressed data is then processed by a forward error correction program which adds parity information to ensure that lost data can be recovered if the two dimensional barcode or image is damaged. This software utilises the Reed-Solomon methodology of creating forward error correction in data streams.

The data is now processed into symbols which form the readable representation of the data. Unlike known two dimensional barcodes which are created as a bit map image, the symbology utilised is a set of ASCII strings. The letters in the string are interpreted by a specially created font file and thus are converted to symbols when printed. This method was adopted as bitmap images occupy large amounts of memory and tend to significantly slow down the printing process utilised by the printers of cheque books. FIG. 1 shows a sample of a two dimensional barcode in a text string format.

When the data shown in FIG. 1 is printed via a specially created "True Type" (trade mark) font set file which interprets the text string into two dimensional barcode symbols, the resulting image as shown in FIG. 2 is obtained.

Once the text string representation of the 2D barcodes has been created for each cheque in a cheque book, it is loaded to the printer buffer and the two dimensional barcode is printed on the cheque. The two dimensional barcode or image is printed over the infra red reflective background ink utilising a laser printer (or other conventional printer) which makes use of carbon based black ink. This means that the printed image is substantially invisible under visible light. Such ink is absorbent of infra red light, so that the infra red responsiveness of the background ink is inhibited wherever the symbols are printed on top of it.

Most if not all laser printers as well as thermal transfer printers make use of inks which have a very high carbon content. In commercial printing such as offset printing, most Pantone colour mixes which are dark or near black have a high content of carbon.

The apparatus used to read the data in the printed image or barcode is shown FIG. 3, in a highly simplified schematic form. In FIG. 3, a high resolution CCD camera 10 is shown which is arranged to scan a two dimensional barcode 12 on a cheque or voucher 14 when the latter is positioned correctly. A set of light emitting diodes 16, which may be arranged in a ring around the lens 18 of the camera 10 direct infra red light onto the cheque or voucher 14. Reflected infra red light passes through an infra red filter 20 mounted in front of the lens 18 before entering the camera. Other light is rejected.

Since the background ink used to print the image 12 is highly reflective in the relevant frequency range, particularly in the range 850 nm to 900 nm, light from unprinted portions of the symbol is reflected and sensed by the CCD camera. The foreground ink printed over the background ink and representing the printed symbols has a high carbon content with inhibited infra red reflectivity (or enhanced absorption) between approximately 750 nm and 1000 nm. Thus, the CCD of the camera is able to discriminate between the printed and unprinted portions of the symbol and to generate an image thereof. This image is fed to a "frame grabber" or other image capture device, and can then be fed to a PC24 or another device for storage and display. The image is now available as a computer image file for decoding by suitable decoding software.

By utilising a suitable level of the encryption in the encoded data represented by the image, such as a multi-layer private/public key encryption method, the data itself is adequately safeguarded against attempts to decode or alter it. The present invention enhances the security of such systems by preventing copying thereof.

Due to the large amount of light reflected by the background portion of the symbol, the CCD camera "sees" this portion of the image as white, whereas those parts which have conventional ink printed on them appear black, and the two dimensional barcode image or symbol therefor is separated or extracted from the background. However, since both inks appear black when illuminated by visible light, conventional imaging devices such as scanners or photocopiers cannot extract the symbols from the background.

The invention claimed is:

1. A method of generating a non-reproducible printed image on a document including a conventionally printed image, the method comprising the steps of:
    applying a first, background layer of a first ink that has little or no carbon content, which has a dark color and absorbs visible light but reflects light of a predetermined wavelength or range of wavelengths, to a portion of a substrate in a preprocessing step; and
    printing said conventionally printed image, and printing the non-reproducible image on the background layer adjacent to said conventionally printed image using a second ink that has a high carbon content, which has a dark color that is visually indistinguishable from the first ink and absorbs both visible light and light of the wavelength or range of wavelengths in a document printing step,
    wherein said non-reproducible image is substantially invisible relative to the background layer under visible light, copying of the document by a conventional imaging device utilizing visible light can reproduce said conventionally printed image but cannot extract said non-reproducible image from the background layer, and the non-reproducible image becomes discernable by illumination of said non-reproducible image by light of the wavelength or range of wavelengths.

2. A method according to claim 1 wherein the wavelength or range of wavelengths is in the infrared spectrum.

3. A method according to claim 2 wherein the first ink is reflective to light having a wavelength in the range of 850 nm to 900 nm.

4. A method according to claim 2 wherein the second ink is absorbent of light having a wavelength in the range 750 nm to 1000 nm.

5. A method according to claim 1 wherein the substrate comprises sheet material.

6. A method according to claim 5 wherein the substrate is a sheet of paper, a card, a tag, a label, a ticket, or an identification plate.

7. A method according to claim 1 wherein the image is a bar-code or symbolic image comprising computer-readable data.

8. A method according to claim 7 wherein the image is a two-dimensional encrypted bar-code or symbolic image.

9. Apparatus for reading a non-reproducible printed image printed by the method of claim 1, the apparatus comprising:
    a camera;
    a filter for filtering an image captured by the camera at a predetermined wavelength or range of wavelengths; and
    an illuminator arranged to illuminate the non-reproducible printed image with light at said wavelengths or range of wavelengths, so that light reflected by the first, background layer of the printed image is passed by the filter, permitting reproduction of the image by the camera.

10. Apparatus according to claim 9 wherein the filter comprises an infra red filter which passes infra red light and the illuminator comprises an infra red light source.

11. Apparatus according to claim 9 wherein the camera comprises a CCD and generates a digitized image of the image.

12. Apparatus according to claim 9 including an image capture device connectable to the camera for storing the digitized image and transmitting the image to a computer.

13. The method of claim 7, wherein the image comprises encrypted data.

14. The method of claim 13, wherein the data has been processed by a forward error correction program that adds parity information.

15. The method of claim 14, wherein the data is compressed prior to being processed by the forward error correction program.

16. The method of claim 15, wherein the compressed data that has been processed by the forward error correction program in then processed into symbols.

17. The method of claim 16, wherein the symbols are a set of ASCII strings.

18. A method of generating a non-reproducible printed image on a document including a conventionally printed image, the method comprising the steps of:

applying a first, background layer of a first ink that has little or no carbon content, which has a dark color and absorbs visible light but reflects light of a predetermined wavelength or range of wavelengths, to a portion of a substrate in a preprocessing step; and printing said conventionally printed image, and printing the non-reproducible image on the background layer adjacent to said conventionally printed image using a second ink that has a high carbon content, which has a dark color that is visually indistinguishable from the first ink when illuminated by visible light and absorbs both visible light and light of the wavelength or range of wavelengths, in a document printing step, wherein said non-reproducible image comprises encrypted data, and the non-reproducible image becomes discernable by illumination of said non-reproducible image by light of the wavelength or range of wavelengths.

* * * * *